United States Patent
Won et al.

(10) Patent No.: US 9,448,463 B2
(45) Date of Patent: Sep. 20, 2016

(54) FOCUS CONTROL IN CONTINUOUS SHOOTING IN DIGITAL PHOTOGRAPHING APPARATUS

(71) Applicant: SAMSUNG ELECTRONICS CO., LTD., Suwon-si, Gyeonggi-do (KR)

(72) Inventors: Jong-hoon Won, Suwon-si (KR); Yuki Endo, Yokohama (JP); Kazuhiko Sugimoto, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 210 days.

(21) Appl. No.: 14/105,896

(22) Filed: Dec. 13, 2013

(65) Prior Publication Data
US 2014/0184888 A1 Jul. 3, 2014

(30) Foreign Application Priority Data

Jan. 2, 2013 (KR) .................. 10-2013-0000252

(51) Int. Cl.
*H04N 5/232* (2006.01)
*G03B 13/36* (2006.01)

(52) U.S. Cl.
CPC .......... *G03B 13/36* (2013.01); *H04N 5/23212* (2013.01)

(58) Field of Classification Search
CPC .................. G03B 13/36; H04N 5/23212
See application file for complete search history.

(56) References Cited

U.S. PATENT DOCUMENTS

| 8,421,905 B2 | 4/2013 | Sugimoto | |
| 2005/0012846 A1* | 1/2005 | Shinohara | H04N 5/23212 348/345 |
| 2009/0128640 A1* | 5/2009 | Yumiki | G03B 5/02 348/208.6 |
| 2010/0194897 A1* | 8/2010 | Yumiki | G03B 7/091 348/208.4 |
| 2012/0182462 A1 | 7/2012 | Hamada | |
| 2012/0236198 A1* | 9/2012 | Hamada | G02B 7/36 348/352 |
| 2012/0321288 A1 | 12/2012 | Ishibashi et al. | |
| 2013/0033638 A1* | 2/2013 | Hamada | H04N 5/23209 348/345 |
| 2015/0237260 A1* | 8/2015 | Mukunashi | H04N 5/23287 348/208.11 |

FOREIGN PATENT DOCUMENTS

JP 2009-133903 A 6/2009

OTHER PUBLICATIONS

Extended European Search Report issued for EP 13195213.7 (Jan. 29, 2015).

* cited by examiner

*Primary Examiner* — Amy Hsu
(74) *Attorney, Agent, or Firm* — Drinker Biddle & Reath LLP

(57) ABSTRACT

A digital photographing apparatus includes a focus lens, a focus detection unit that detects focus in a contrast auto focusing (AF) method by moving the focus lens, and a controller that calculates a velocity of a subject from a first focus detection result and a second focus detection result in a continuous shooting operation. The controller restricts a U-turn driving for correcting backlash of the focus lens when the calculated velocity of the subject is equal to or greater than a predetermined value. An AF initiating location and a final correction operation are adaptively adjusted based on the velocity of the subject in each process of the continuous shooting, thereby improving an AF performance and the continuous photographing speed.

10 Claims, 14 Drawing Sheets

FOCUS CONTROL IN CONTINUOUS SHOOTING IN DIGITAL PHOTOGRAPHING APPARATUS

CROSS-REFERENCE TO RELATED PATENT APPLICATION

This application claims the priority benefit under 35 U.S.C. §119(a) from Korean Patent Application No. 10-2013-0000252, filed on Jan. 2, 2013, in the Korean Intellectual Property Office, the disclosure of which is incorporated herein in its entirety by reference.

BACKGROUND

1. Field

Various embodiments of the invention relate to a digital photographing apparatus using a contrast auto-focusing (AF) method, the digital photographing apparatus being capable of performing high speed continuous shooting, and a method of controlling the digital photographing apparatus.

2. Description of the Related Art

Recently, digital photographing apparatuses such as digital still cameras, digital single lens reflex (DSLR) cameras, mobile phone cameras, and smartphone cameras have provided a continuous shooting function. A shooting interval during continuous shooting may vary depending on the characteristics of the digital photographing apparatus. In general, a digital photographing apparatus using a contrast auto-focusing (AF) method has a relatively longer shooting interval than that of a digital photographing apparatus using a phase-difference AF method. This is because in an AF device using a contrast method, in order to detect an AF location where a radio frequency (RF) component of an image signal is the highest, a focus lens of the device must be moved to pass through a location where a radio frequency (RF) component is maximum and then moved to return back to the AF location. Also, in the contrast AF method, U-turn correction for correcting back-lash is necessary in order to move the focus lens to a focus initiating location or to drive the focus lens to the AF location in a continuous shooting operation for improving the accuracy of detecting a focus, thereby increasing a time for the AF operation.

SUMMARY

Various embodiments of the invention provide a digital photographing apparatus using a contrast auto-focusing (AF) method and a method of controlling the digital photographing apparatus, wherein the digital photographing apparatus is capable of improving the AF performance and a continuous shooting speed by adaptively adjusting a U-turn correction operation for correcting back-lash and an AF initiating location according to a speed of a detected subject in each continuous shooting operation.

According to an embodiment, a digital photographing apparatus includes a focus lens, a focus detection unit that detects focus in a contrast auto focusing (AF) method by moving the focus lens, and a controller that calculates a velocity of a subject from a first focus detection result and a second focus detection result in a continuous shooting operation. The controller restricts a U-turn driving for correcting backlash of the focus lens when the calculated velocity of the subject is equal to or greater than a predetermined value.

The controller may drive the focus lens to a location that is obtained by adding a backlash correction value to the detected focus, if the U-turn driving is restricted.

The velocity of the subject may be calculated based on at least two or more focus detection results.

The controller may calculate a difference between the first focus detection result and the second focus detection result. When the difference is equal to or greater than a predetermined value, the controller may restrict the U-turn driving that is performed for correcting the backlash of the focus lens.

According to another embodiment, a digital photographing apparatus includes a focus lens, a focus detection unit that detects focus in a contrast auto-focusing (AF) method by moving the focus lens, an imaging device that is exposed to light incident through the focus lens and reads-out an image signal, and a controller that sets an AF initiating location based on a first focus detection result and a second focus detection result in a continuous shooting operation. The controller moves the focus lens to the AF initiating location during the read-out of the imaging device.

The controller may predict a location of a subject by calculating a difference between the first focus detection result and the second focus detection result, and may set the AF initiating location based on the predicted location of the subject.

The controller may calculate a velocity or a moving distance of the subject based on the first and second focus detection results, and may set the AF initiating location based on the velocity or the moving distance of the subject.

The velocity or the moving distance of the subject may be calculated based on an average of at least two or more focus detection results.

The controller may control a focus detection speed based on the velocity or the moving distance of the subject.

According to another embodiment, a method of controlling a continuous shooting operation of a digital photographing apparatus includes detecting focus in a contrast auto-focusing (AF) method by moving a focus lens, calculating a velocity of a subject based on a first focus detection result and a second focus detection result in a continuous shooting operation, and restricting a U-turn driving that is performed to correct backlash of the focus lens when the calculated velocity of the subject is equal to or greater than a predetermined value.

In the restricting of the U-turn driving, the focus lens may be moved to a location that is obtained by adding a backlash correction value to the detected focus.

The method may further include exposing an imaging device to light that is incident through the focus lens and performing a read-out. An AF initiating location may be set based on the velocity of the subject. The focus lens may be moved to the AF initiating location during the read-out of the imaging device, before the restricting of the U-turn driving.

According to another embodiment, a non-transitory recording medium includes a program for executing the above described method.

BRIEF DESCRIPTION OF THE DRAWINGS

The above and other features and advantages of the embodiments will become more apparent by describing in detail exemplary embodiments thereof with reference to the attached drawings in which.

DETAILED DESCRIPTION

Expressions such as "at least one of," when preceding a list of elements, modify the entire list of elements and do not modify the individual elements of the list.

A digital photographing apparatus according to various embodiments will be described below with reference to the accompanying drawings. Hereinafter, a digital camera will be described as an example of the digital photographing apparatus. However, the present invention is not limited thereto, and may be applied to other digital appliances such as digital camcorders, personal digital assistants (PDAs), and smartphones.

Embodiments will be described with reference to the accompanying drawings.

Figure 1:
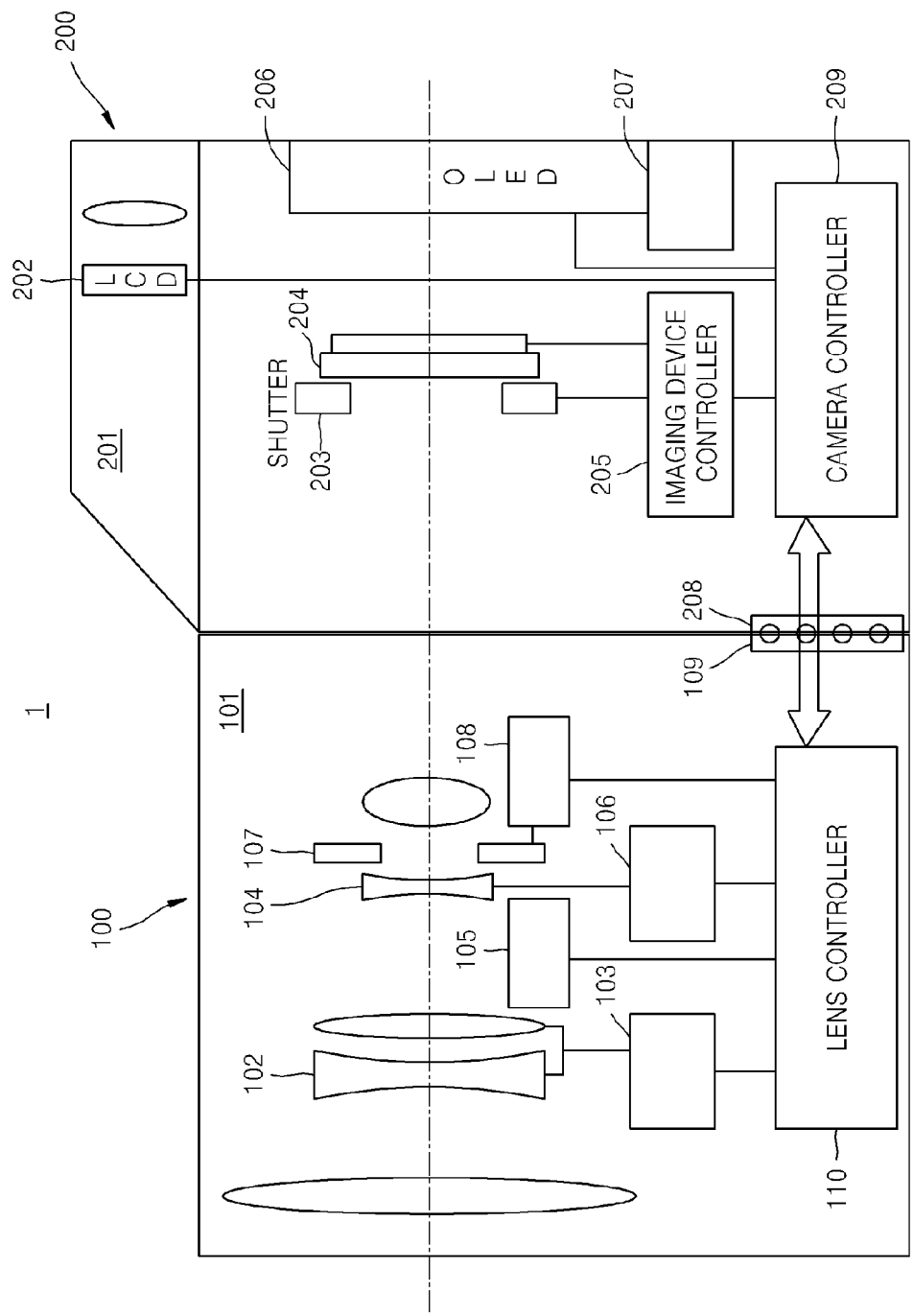
FIG. 1 is a diagram of a digital photographing apparatus according to an embodiment.

FIG. 1 is a diagram showing a digital photographing apparatus 1 according to an embodiment.

Referring to FIG. 1, the digital photographing apparatus 1 includes an exchangeable lens 100 and a main body 200. The exchangeable lens 100 provides a focus detecting function, and the main body 200 controls the exchangeable lens 100 to drive a focus lens 104 mounted therein.

The exchangeable lens 100 includes a focusing optics 101, a zoom lens location detection sensor 103, a lens driving unit 105, a focus lens location detection sensor 106, an aperture driving unit 108, a lens controller 110, and a lens mount 109.

The focusing optics 101 includes a zoom lens 102 for adjusting the zoom, the focus lens 104 for changing an auto-focusing (AF) location, and an aperture 107. The zoom lens 102 and the focus lens 104 may be respectively configured as lens groups, each including a plurality of lenses.

The zoom lens location detection sensor 103 and the focus lens location detection sensor 106 detect locations of the zoom lens 102 and the focus lens 104, respectively. A timing of detecting the location of the focus lens 104 may be set by the lens controller 110 or a camera controller 209 that will be described below. For example, the timing of detecting the location of the focus lens 104 may be a timing based on detecting focus from an image signal.

The lens driving unit 105 and the aperture driving unit 108 are controlled by the lens controller 110 to drive the focus lens 104 and the aperture 107, respectively. In particular, the lens driving unit 105 drives the focus lens 104 in an optical axis direction.

The lens controller 110 transmits information about the detected location of the focus lens 104 to the main body 200. Here, the lens controller 110 may transmit the detected location information of the focus lens 104 to the main body 200 when a variation in the location of the focus lens 104 exists or when the camera controller 209 requests the location information of the focus lens 104.

The lens mount 109 includes a lens side communication pin that is engaged with a camera side communication pin to be used as a transmission path of data or control signals.

The main body 200 is as follows.

The main body 200 includes a view finder (VF) 201, a shutter 203, an imaging device 204, an imaging device controller 205, a display unit 206, a manipulation unit 207, a camera controller 209, and a camera mount 208.

The view finder 201 includes a liquid crystal display (LCD) unit 202 that allows a user to view images in real-time during an imaging operation.

The shutter 203 determines a time for light to be incident on the imaging device 204, for example, an exposure time.

The imaging device 204 converts an input optical signal received through the focusing optics 101 of the exchangeable lens 100 to generate an image signal. The imaging device 204 may include a plurality of photoelectric conversion units arranged as a matrix, and a horizontal transmission path for moving electric charges from the photoelectric conversion units to read the image signal.

The imaging device controller 205 generates a timing signal and controls the imaging device 204 to perform the conversion operation in synchronization with the timing signal. Also, the imaging device controller 205 reads image signals sequentially when charge accumulation in each of scanning lines is finished. The image signal read by the imaging device controller 205 is used to detect the focus by the camera controller 209.

The display unit 206 displays various images and information. The display unit 206 may be an organic light emitting display (OLED) or a liquid crystal display (LCD).

The manipulation unit 207 inputs various commands from a user for manipulating the digital photographing apparatus 1. The manipulation unit 207 may include various buttons, for example, a shutter release button, a main switch, a mode dial, and a menu button.

The camera controller 209 performs a focus detection from the image signal generated by the imaging device 204 to calculate a focus evaluation value. Also, the camera controller 209 may calculate and store the focus evaluation value at focus detection times according to the timing signal generated by the imaging device controller 205. The camera controller 209 may also calculate a destination location of the focus lens based on lens location information received from the exchangeable lens 100 and the stored focus evaluation value. The calculated destination location of the focus lens may be transmitted to the exchangeable lens 100.

The camera mount 208 includes the camera side communication pin.

Hereinafter, operations of the exchangeable lens 100 and the main body 200 will be described below.

When a subject is photographed, a main switch (MS) included in the manipulation unit 207 is manipulated to start the operation of the digital photographing apparatus 1. The digital photographing apparatus 1 performs the live view display operation as follows.

An optical signal of the subject, which has been transmitted through the focusing optics 101, is incident onto the imaging device 204. Here, the shutter 203 is in an open state. The optical signal from the subject is converted into an electric signal in the imaging device 204, and an image signal is generated from the electric signal. The imaging device 204 operates according to the timing signal generated in the imaging device controller 205. The image signal from the subject is converted into image data by the camera controller 209. The image data may be displayed and accordingly may be output to the view finder 201 or the display unit 206. Such operations are live view displaying operations, and live view images displayed in the live view display operation may be successively displayed as a moving picture.

After performing the live view display, when a shutter-release button included in the manipulation unit 207 is half-pushed, the digital photographing apparatus 1 starts an auto focusing (AF) operation. The AF operation is performed based on the image signal generated by the imaging device 204. For example, the destination location of the focus lens is calculated from the focus evaluation value relating to a contrast value according to the contrast AF method, and the exchangeable lens 100 is driven based on the calculation result. The focus evaluation value is calculated by the camera controller 209. The camera controller 209 calculates information for controlling the focus lens 104 from the focus evaluation value, and transmits the information to the lens controller 110 via the communication pins in the lens mount 109 and the camera mount 208.

The lens controller 110 controls the lens driving unit 105 based on the received information to drive the focus lens 104 in the optical axis direction so as to perform the AF operation. The location of the focus lens 104 is monitored by the focus lens location detection sensor 106, and is fed back to the camera controller 209 via the lens controller 110.

When the user operates the zoom lens 102, the location of the zoom lens 102 is sensed by the zoom lens location detection sensor 103, and the lens controller 110 changes AF control parameters of the focus lens 104 and performs the AF operation again.

When the subject is focused on, the shutter-release button may be fully pushed (S2) to perform an exposure of the digital photographing apparatus 1. In this case, the camera controller 209 completely closes the shutter 203 first, and then transmits aperture control information, based on photometric information acquired from the lens controller 110, to the lens controller 110. The lens controller 110 controls the aperture driving unit 108 based on the aperture control information, and the aperture driving unit 108 drives the aperture 107 to have an appropriate aperture value. The camera controller 209 controls the shutter 203 based on the photometric information, and opens the shutter 203 for an appropriate exposure time to perform the photographing operation, thereby capturing an image of the subject.

The captured image may be stored in a memory card 212 after performing an image signal process and a compression process. At the same time, the captured image may be output to the view finder 201 and the display unit 206, which display the subject. This image is referred to as a quick view image.

Through the above procedure, a series of photographing operations is finished.

Figure 2:
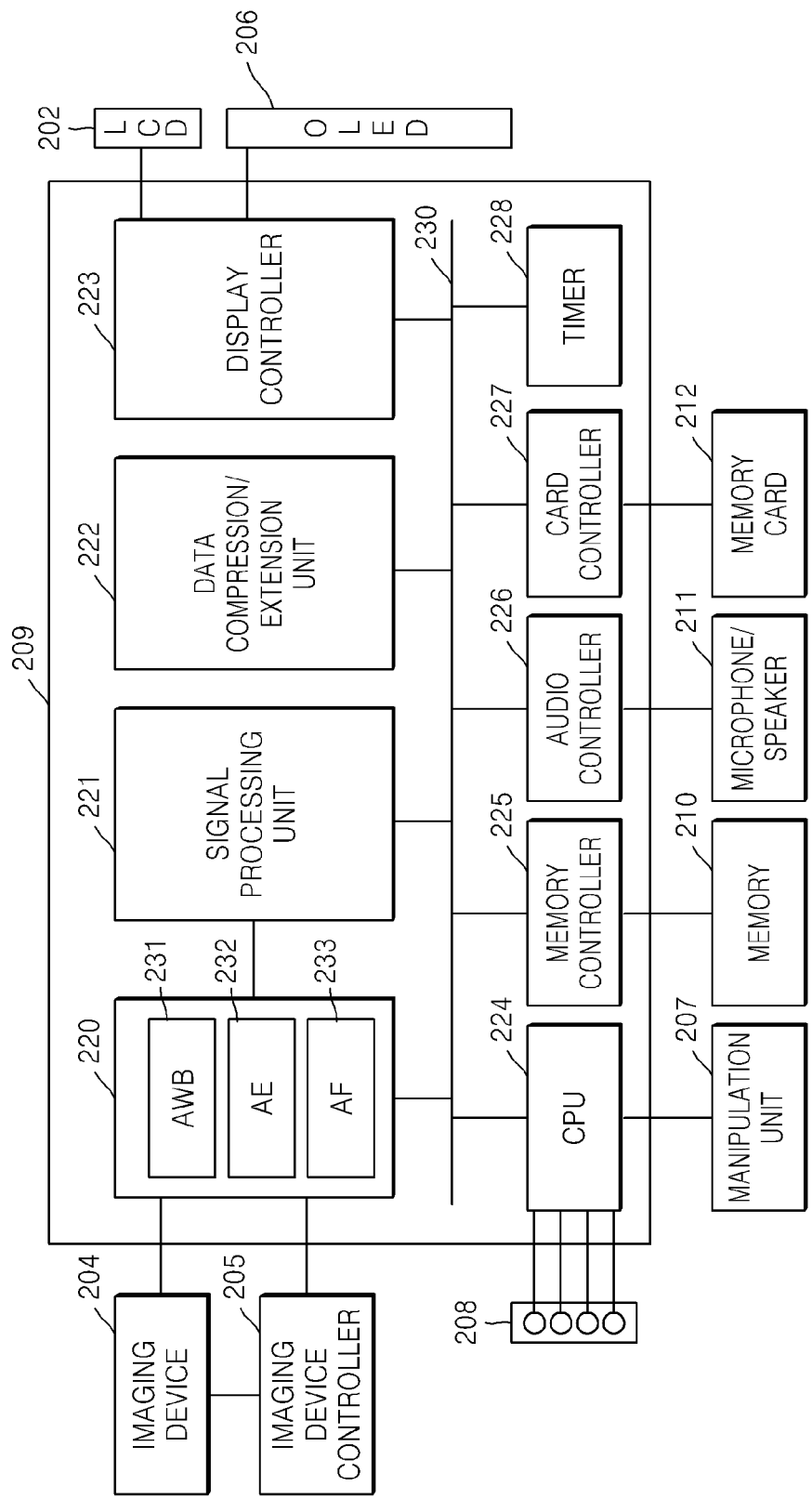
FIG. 2 is a block diagram of a camera controller shown in FIG. 1.

FIG. 2 is a block diagram of the camera controller 209 in the digital photographing apparatus 1 shown in FIG. 1.

Referring to FIG. 2, the camera controller 209 includes a preliminary processing unit 220, a signal processing unit 221, a data compression/extension unit 222, a display controller 223, a central processing unit (CPU) 224, a memory controller 225, an audio controller 226, a card controller 227, a timer 228, and a main bus 230.

The camera controller 209 transmits various commands and data to other components via the main bus 230.

The preliminary processing unit 220 receives the image signal generated by the imaging device 204 and performs processes, for example, an auto white balance (AWB component 231), an auto exposure (AE component 232), and an auto focusing (AF component 233). In particular, the preliminary processing unit 220 includes a focus evaluation value calculator (e.g., a focus detection unit or the AF component 233) for calculating the focus evaluation value based on the focus state of the image signal generated by the imaging device 204. Also, the preliminary processing unit 220 includes a white balance evaluation value calculator and an exposure evaluation value calculator calculating evaluation values for adjusting the exposure and the white balance.

The signal processing unit 221 may perform a series of image signal processes such as gamma correction to generate a live view image or a captured image that may be displayed on the display unit 206.

The data compression/extension unit 222 compresses the image signal in a compression format such as a joint picture experts group (JPEG) format or H.264 compression format. An image file including the image data generated by the compression is transferred to the memory card 212 to be stored therein.

The display controller 223 controls an output of the image to the display screen such as an LCD 202 of the view finder 201 or the display unit 206.

The CPU 224 controls overall operations of the components of the digital photographing apparatus 1. Also, in the digital photographing apparatus 1 shown in FIG. 1, the CPU 224 communicates with the lens controller 110 via the communication pins in the lens mount 109 and the camera mount 208.

The memory controller 225 controls a memory 210 that temporarily stores data such as captured images and related information, and the audio controller 226 controls a microphone or a speaker 211. Also, the card controller 227 controls the memory card 212 that stores the captured images. The timer 228 measures time.

Figure 3:
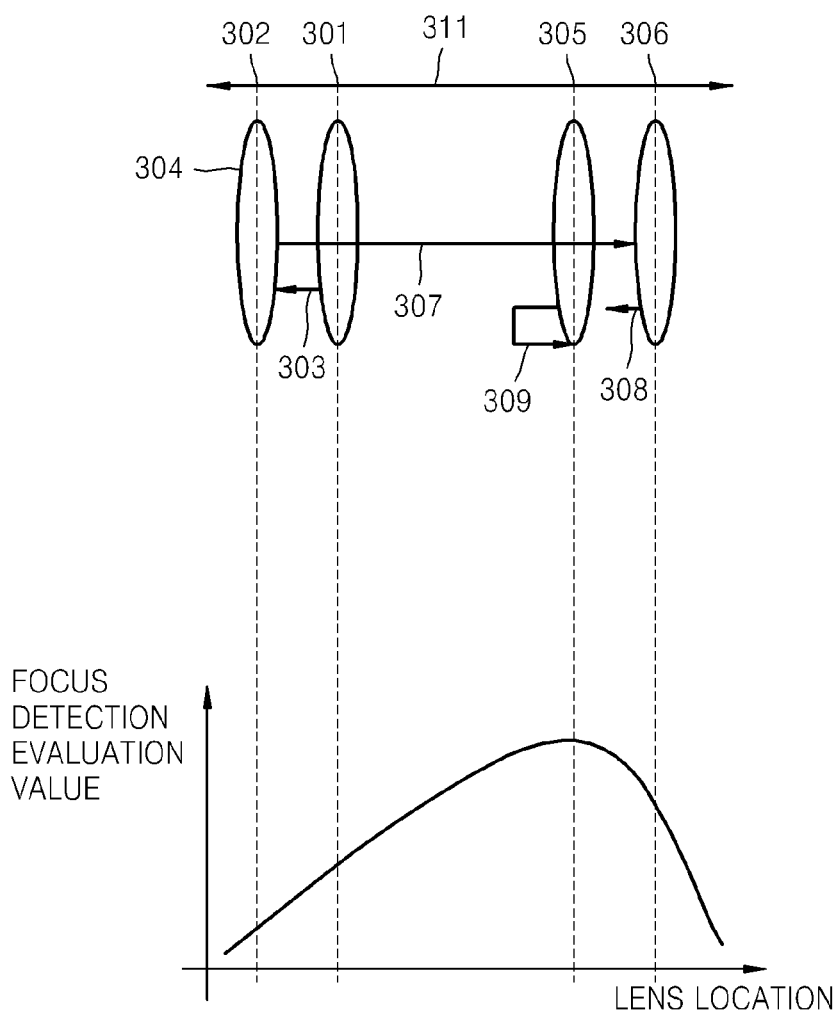
FIG. 3 is a schematic diagram showing a movement of a focus lens in the digital photographing apparatus of FIG. 1 when a continuous shooting operation is performed.

FIG. 3 is a schematic diagram showing a movement of a focus lens 304 in the digital photographing apparatus 1, where the digital photographing apparatus 1 is capable of performing a continuous shooting operation.

The AF operation will be described below in a case where the digital photographing apparatus 1 is turned on. In this case, the focus lens 304 is located at a current location 301 in the digital photographing apparatus 1. In an embodiment using the contrast AF method, when a user tries to perform the AF operation, the focus lens 304 moves (303) to an AF initiating location 302 located in a direction opposite to the subject (e.g., in an infinite direction), and after that, the camera controller 209 determines an AF location 305 of the focus lens 304 for the subject while moving the focus lens 304 toward the subject (in a near direction) within a moveable range 311. The focus lens 304 is moved to the AF initiating location 302 that is opposite to the subject without directly moving in the direction towards the subject to deal with a case where a focused location of the focus lens 304 for the subject is in the infinite direction. For example, if the focus lens 304 directly moves toward the subject, an AF location that is in the infinite direction (e.g., opposite the subject) may not be found.

However, due to the above operation, an additional moving distance (current location 301 to AF initiating location 302, and AF initiating location 302 to current location 301) increases, and the focus lens 304 has to additionally switch the moving direction twice, thereby increasing a time taken to perform the AF operation.

Also, if the focused location of the subject is searched for while moving the focus lens 304, it has to be determined whether a peak value of the focus detection evaluation value exists or not during the movement of the focus lens 304, and thus, the focus lens 304 may be moved further beyond the AF location 305 to a location 306 while the determination of the AF location 305 is made. Therefore, after finding the AF location 305, the focus lens 304 is moved from the location 306 to the AF location 305 to take a focused image. Since a gear (not shown) is used to move the focus lens 304 to the AF location 305, and driving directions of the focus lens 304 when the peak value is detected and when the focus lens 304 is moved to the AF location 305 are different from each other, it is difficult to accurately locate the focus lens 304 at the AF location 305 due to a separation of the gear. This problem is referred to as backlash. In order to address the backlash, a U-turn correction 309 is generally performed. The U-turn correction 309 denotes an addition of a U-turn when the focus lens 304 is moved to the AF location 305 from the location 306. In the contrast AF method, the driving directions of the focus lens 304 when the AF location 305 is detected (e.g., at 307) and when the focus lens 304 is moved to the detected AF location 305 (e.g., at 308) are opposite to each other. Accordingly, the focus lens 304 may be driven in the same direction (e.g., at 309) as that in which the AF location 305 is detected (e.g., at 307). However, due to the U-turn correction, a moving distance 309 increases additionally, and a two-time switching operation has to be added, thereby increasing the time taken to perform the AF operation.

Figure 4:
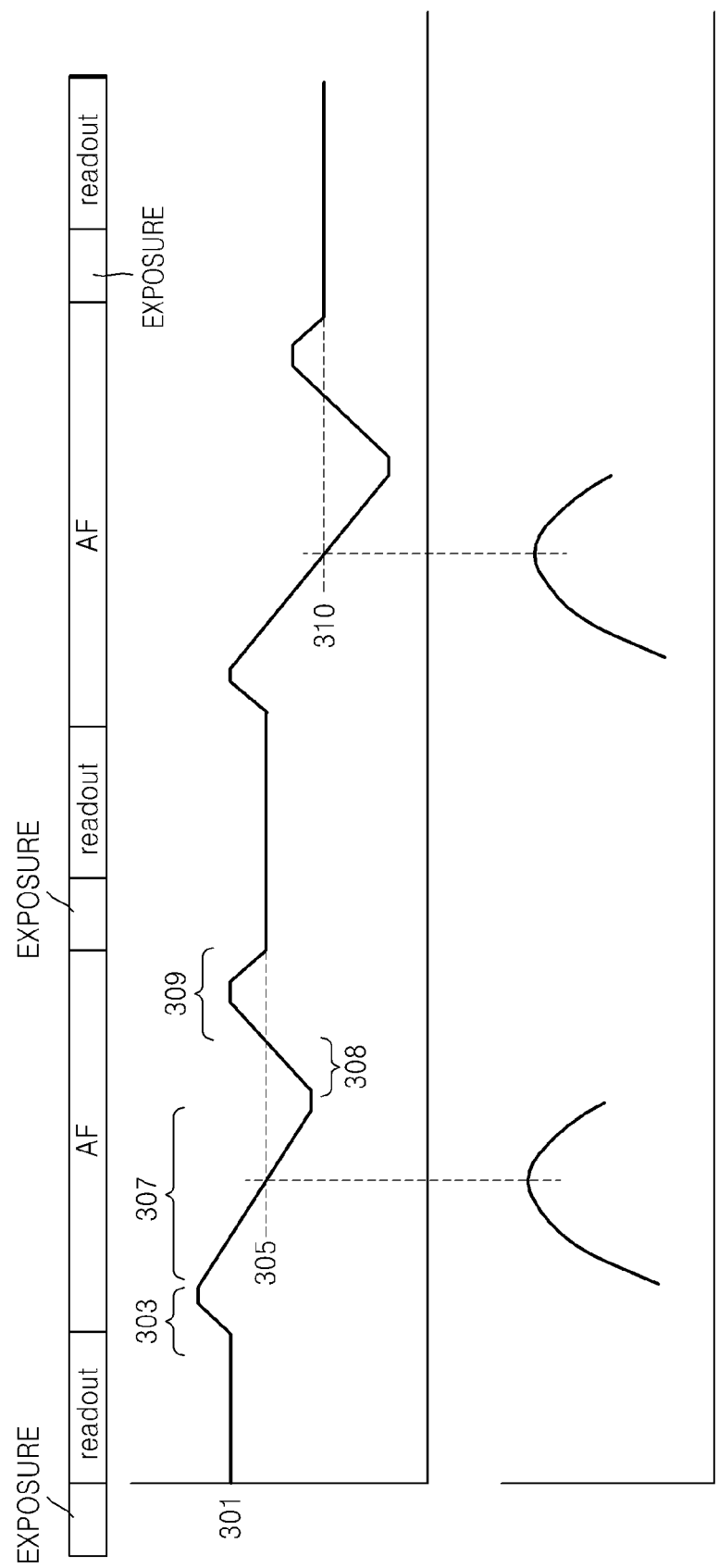
FIG. 4 is a timing view showing the movement of the focus lens in the digital photographing apparatus of FIG. 1 when the continuous shooting operation is performed.

FIG. 4 is a timing diagram showing a movement of the focus lens 304 in the digital photographing apparatus 1 of FIG. 1.

Referring to FIG. 4, as illustrated with reference to FIG. 3, the focus lens 304 moves (303) to the AF initiating location 302 that is opposite to the subject, and then, the focus lens 304 searches for the AF location 305 of the subject while moving toward the subject (307). In a continuous shooting operation, the AF location 305 is not necessarily located at the current location 301. The focus lens 304 is moved a predetermined distance from the current location (e.g., a previous AF location) in the infinite direction because the AF location 305 may be located near the current position 301 due to a short photographing interval in the continuous shooting operation. If the AF location 305 of the subject is found, the focus lens 304 is moved from the location 306 to the AF location 305 through a rear driving (308) and the U-turn correction (309). After that, an exposure of the imaging device 204 and a read-out are performed. In the continuous shooting operation, the above operations 303, 307, 308, and 309 are repeatedly performed after the read-out, for example, moving to an AF location 310.

Therefore, a time for performing one photographing operation becomes an interval of the continuous shooting.

Figure 5A:
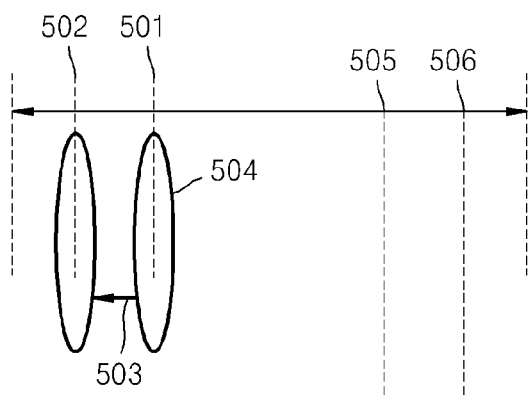
FIGS. 5(A), 5(B), and 5(C) are schematic diagrams showing a movement of a focus lens in a digital photographing apparatus of FIG. 1 when a continuous shooting operation is performed according to an embodiment.
Figure 5B:
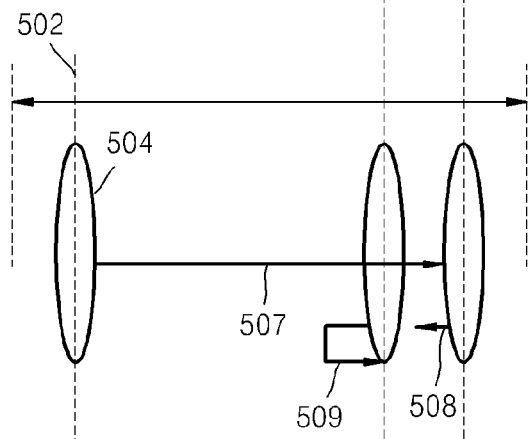
Figure 5C:
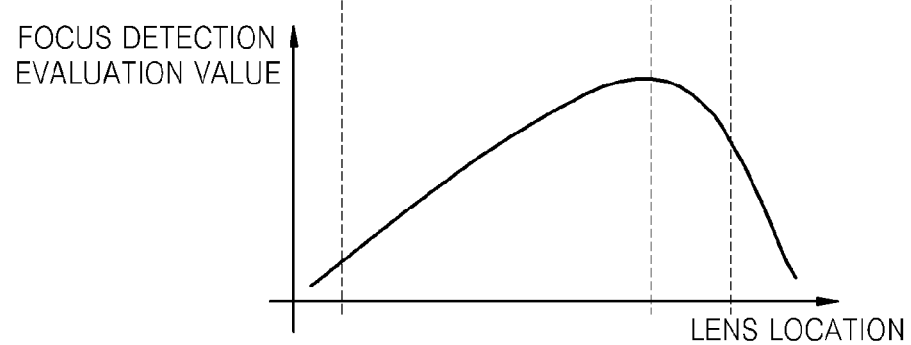

FIGS. 5(A), 5(B), and 5(C) are schematic diagrams showing movement of a focus lens 504 in the digital photographing apparatus 1 of FIG. 1, according to an embodiment.

FIG. 5A shows a preliminary operation (503) of the focus lens 504. In the contrast AF method, the focus lens 504 is moved (503) a predetermined distance in the infinite direction to an AF initiating location 502 before starting the focus detection, to deal with a case where a focused location of the focus lens 504 for the subject is located in the infinite direction from the current location 501. However, unlike the embodiment of FIG. 3, the preliminary operation 503 for driving the focus lens 504 to the AF initiating location 502 is performed in advance, before the previous shooting operation is finished, for example, during the read-out. As described with reference to FIG. 3, in order to move the focus lens 504 to the AF initiating location 502 in the continuous shooting operation, the focus lens 504 has to switch the moving direction twice, and thus, the time for performing the AF operation is increased. However, according to the present embodiment, the focus lens 504 is moved to the AF initiating location 502 in advance before the previous shooting is finished, for example, during the read-out, and thus, the AF time interval may be reduced in the continuous shooting operation. The AF initiating location 502 may be predetermined as a constant location (e.g., as a predetermined distance from the current location), or may be adaptively calculated based on the AF result. For example, the AF results may be compared with each other at every photographing operation to determine a location and a speed of the subject, and accordingly, the AF initiating location may be set. Since the AF initiating location varies, the moving distance of the focus lens in the continuous shooting operation may vary, and accordingly, the AF speed may be changed or improved, which will be described later with reference to FIGS. 7 and 8.

FIG. 5B shows post operations 507, 508, and 509 of a focus lens 504. As described above with reference to FIG. 3, after moving the focus lens 504 to the AF initiating location 502 in the direction that is opposite to the subject, the AF location 505 is searched (507) for while moving the focus lens 504 toward the subject. Also, if the AF location 505 of the subject is found, the focus lens 504 is moved to the AF location 505 through the rear driving (508) and the U-turn correction (509). In addition, after moving the focus lens 504, the exposure of the imaging device 204 is performed, and then, the read-out is performed. At the same time, the AF preliminary operation for moving the focus lens 504 to a next AF initiating location is repeatedly performed. However, according to the present embodiment, the location or the speed of the subject is determined by comparing the AF results, and the U-turn correction 509 may be omitted to improve the AF speed according to the determination result.

Figure 6:
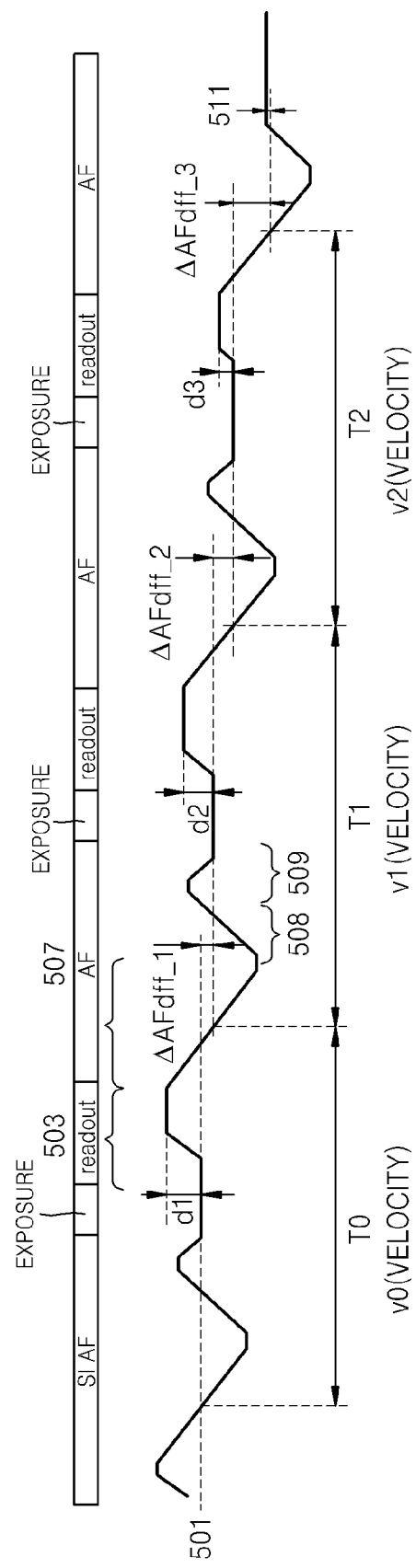
FIG. 6 is a timing view showing the movement of the focus lens in the digital photographing apparatus of FIG. 1 when the continuous shooting operation is performed.

FIG. 6 is a timing diagram showing a movement of the focus lens 504 in the digital photographing apparatus 1 of FIG. 1, according to an embodiment.

Referring to FIG. 6, in the continuous shooting operation of the digital photographing apparatus 1 using the contrast AF method, a configuration of moving the focus lens 504 to AF initiating locations during the read-out is shown. For example, as described above with reference to FIG. 5, the focus lens 504 is moved to the AF initiating location 502 before the next photographing operation starts, and thus, the time interval between the continuous shootings may be reduced.

According to an embodiment, a velocity of the subject may be calculated based on the current AF result, the previous AF result, and a time interval T0, T1, . . . between the operations, and accordingly, the AF initiating location 502 may be adaptively determined based on the calculation result. For example, as denoted by d1, d2, and d3, the AF initiating location may vary with respect to each focus detecting operation based on the AF results, and thus, the AF searching range may be minimized and the photographing interval in the continuous shooting operation may be reduced too. In FIG. 6, the AF initiating location is located toward the infinite direction. However in alternative embodiments, the AF initiating location may be moved in the near direction based on the moving direction and the velocity of the subject. Here, a method of calculating the velocity of the subject and setting the AF initiating location will be described below with reference to FIG. 7.

Also, according to another embodiment, if a difference between the AF results or a moving velocity of the subject on an image side is equal to or greater than a predetermined value, the U-turn for correcting the backlash may be omitted (511), and then, the focus lens 504 is moved to a location to which a backlash correction value is added, thereby reducing the AF operation time and tracking the subject of high velocity effectively. For example, if the subject moves at a high velocity, the U-turn operation for correcting the backlash has a low efficiency for focusing on the subject, and moreover, a focusing error may increase due to the time difference between the focus detection and the photographing operation due to the U-turn operation. Thus, in this case, the U-turn operation may be omitted to reduce the time difference between the focus detection and the photographing operations, and thus, the subject may be more exactly focused. Here, the method of determining the velocity of the subject will be described below with reference to FIG. 7.

Figure 7:
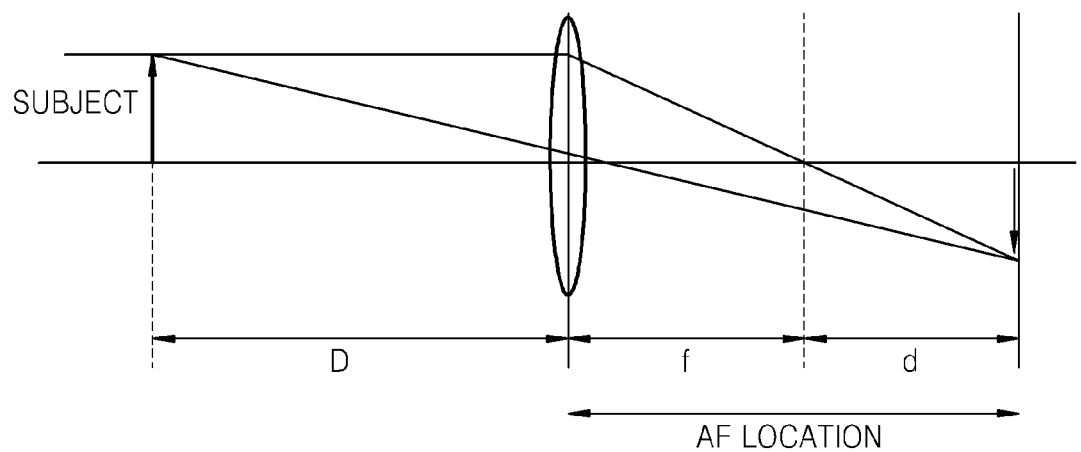
FIG. 7 is a schematic diagram illustrating a method of calculating a location or a velocity of a subject according to an embodiment.

FIG. 7 is a schematic diagram for illustrating a method of calculating a location or velocity of the subject, according to an embodiment. Here, D denotes a distance to the subject from each AF location, f denotes a focal distance, and f+d denotes an AF location.

Referring to FIG. 7, since $d=f^2/(D-f)$ and $D-f=f^2/d$, equation 1 below regarding the distance D to the subject from each AF location may be obtained as follows.

$$D = \frac{f^2}{d} + f \quad (1)$$

Meanwhile, in FIG. 6, when it is assumed that AF locations of the continuous shootings are AF0, AF1, AF2, and AF3 in the stated order and the distances to the subject are D0, D1, D2, and D3, respectively, locations of the subject may be obtained as follows because d=AF−f.

$D0=f^2/(AF0-f)+f$ $D1=f^2/(AF1-f)+f$ $D2=f^2/(AF2-f)+f$ $D3=f^2/(AF3-f)+f$

Also, a velocity of the subject may be obtained as follows.

Velocity between $AF0$ and $AF1(v0)=(D1-D0)/T0$,

Velocity between $AF1$ and $AF2(v1)=(D2-D1)/T1$

Velocity between $AF2$ and $AF3$ $v2=(D3-D2)/T2$

Based on the above equations, AF2 may be predicted by calculating at the AF locations AF0 and AF1 as follows.

$AF2$ predicted distance$=D1+T_{interval}*v0$ $AF2$ predicted location$=f^2/(D1+T_{interval}*V0-f)$ $AF2$ initiating location$=fA2/(D1+T_{interval}*v0-f)-$drive_inf_puls Here, since a difference between the continuous shooting intervals is small, it is assumed that T1, T2, and T3 have a constant value, for example, $T_{interval}$. In addition, dirive_inf_puls denotes a moving amount of the focus lens 104 to the infinite direction, and may be a fixed value. In the continuous shooting operation, when calculating a first AF initiating location (d1 of FIG. 6), since there is no previous AF result, d1 is AF 0−drive_inf_puls. Also, from d2 of FIG. 6, the above described equation for calculating the AF initiating location is used.

According to the above described equation, the velocity or the moving distance of the subject is calculated based on the previous AF result and the current AF result, and the AF initiating location of next photographing may be predicted and adaptively varied based on the velocity or the moving distance of the subject. Thus, if the subject moves with a high velocity, an increase in the AF time may be prevented.

Figure 8:
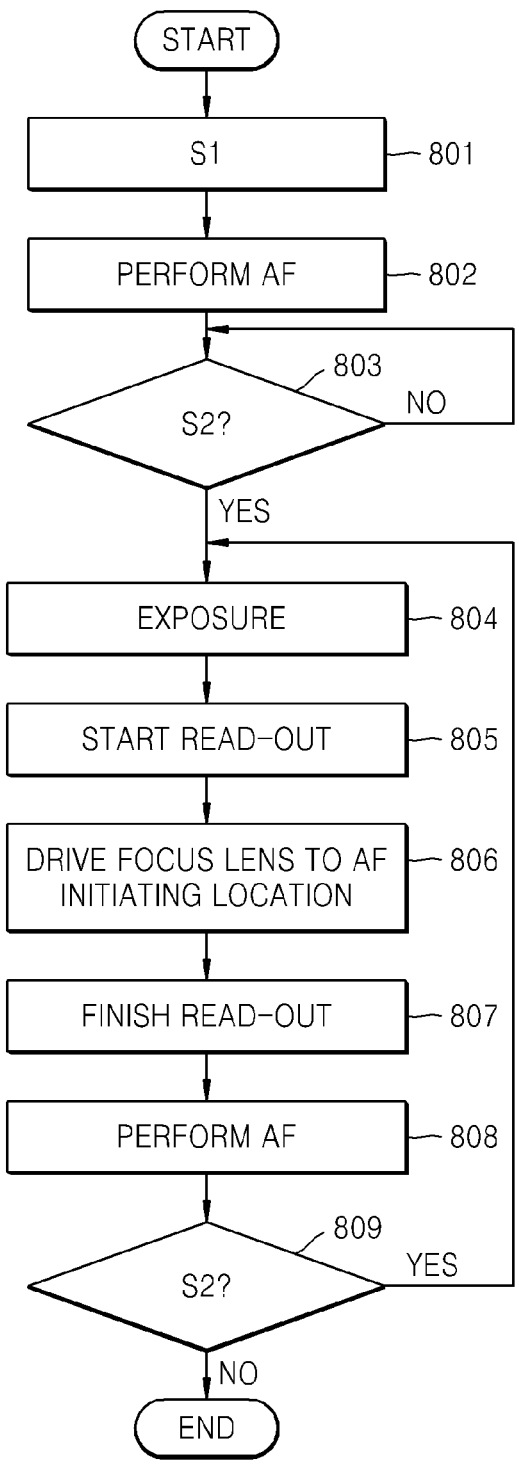
FIG. 8 is a flowchart illustrating processes of moving a focus lens to an auto-focus (AF) initiating location during read-out in a continuous shooting operation, according to the embodiment.

FIG. 8 is a flowchart illustrating a method of moving the focus lens 104 to the AF initiating location during the read-out in the continuous shooting operation, according to an embodiment.

Referring to FIG. 8, when a shutter half-pressed signal s1 is input in operation S801, an AF operation is performed to determine a location of the focus lens 104 in operation S802. Then, it is determined whether a shutter fully-pushed signal S2 is input in operation S803. If the shutter fully-pushed signal S2 is input, the imaging device 204 starts an exposure (S804) and a read-out (S805). During a continuous shooting operation, the focus lens is driven to the AF initiating location before the read-out is finished in operation S806. When the read-out is finished in operation S807, the focus lens 104 is moved in the near direction to detect the focus after omitting the preliminary operation for moving the focus lens 104 to the infinite direction in operation S808. When the AF operation in which the focus is detected and the focus lens 104 is moved to the AF location is finished, it is determined whether the signal S2 is input in operation S809, and then, the operations S804 through S809 are repeatedly performed so that the digital photographing apparatus 1 may perform the continuous shooting operation. According to the present embodiment, the time for moving the focus lens to the AF initiating location during the continuous shooting may be reduced, and thus, the AF operation may be performed fast.

Figure 9A:
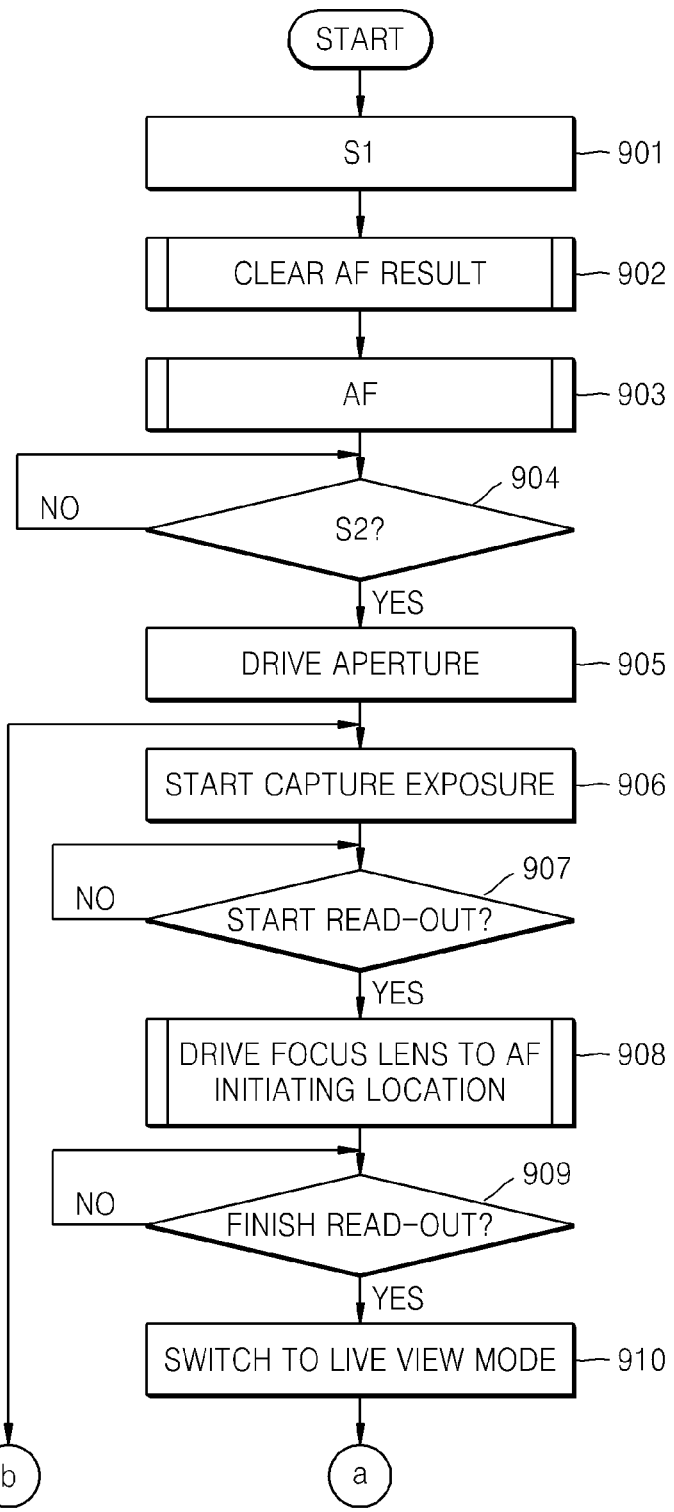
FIGS. 9(A) and 9(B) are flowcharts illustrating processes of performing a high speed continuous shooting operation according to an embodiment.
Figure 9B:
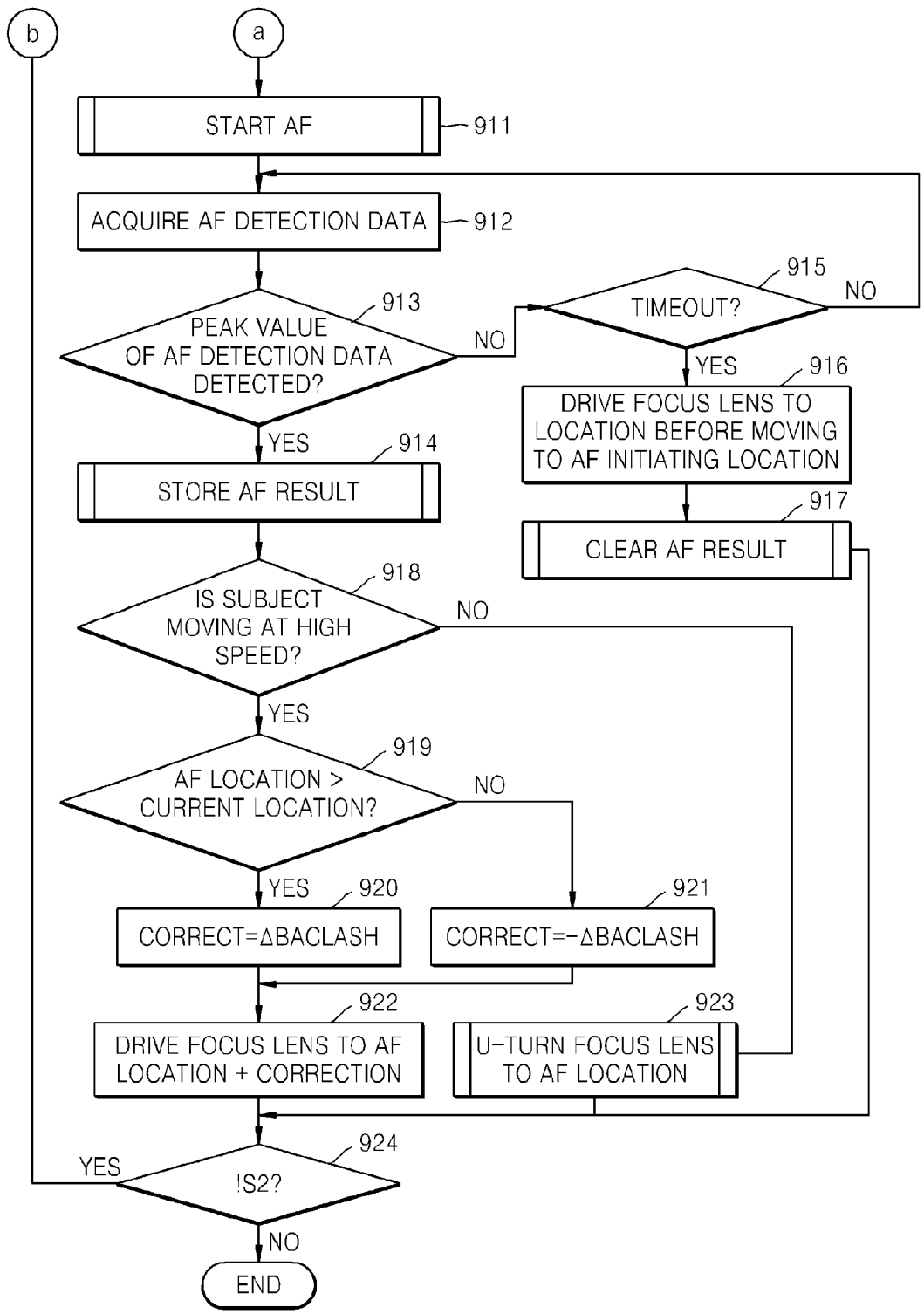

FIGS. 9A and 9B are flowcharts illustrating the continuous shooting operation according to an embodiment.

Referring to FIG. 9A, as a shutter half-push signal s1 is input in operation S901, when the shutter half-pushed signal s1 is input in operation S901, a sub-routine for clearing the AF result is performed in operation S902.

Figure 10:
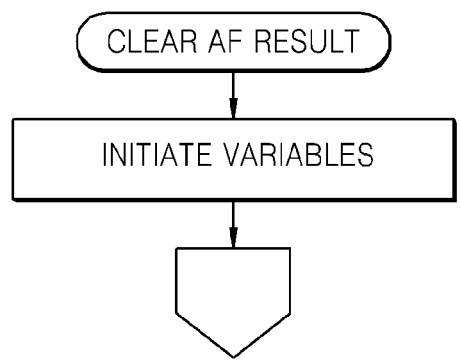
FIG. 10 is a flowchart illustrating a clear sub-routine according to an AF result, according to an embodiment.

FIG. 10 is a flowchart illustrating an AF result clearing sub-routine according to the embodiment. Referring to FIG. 10, before performing the AF operation, the previous AF result is cleared to empty the memory 210. Variables that are related to the AF result and initiated may include at least one of AF_position, AF_position_previous, AF_position_previous2, OBJ_speed, OBJ_speed_previous, OBJ_distance, AF_detect_time, or AF_detect_time_previous. Here, AF_position denotes the current AF location, AF_position_previous denotes the previous AF location, AF_position_previous2 denotes the AF location prior to the previous AF location, OBJ_speed denotes velocity of the subject, OBJ_speed_previous denotes velocity of the subject in the previous operation, OBJ_distance denotes a distance to the subject in the previous operation, AF_detect_time denotes a time of detecting focus, and AF_detect_time_previous denotes a time of detecting the previous focus. Also, algorithms shown in FIGS. 11 through 13 will be described by using the variables defined herein. In this process, the above variables may be set as 0 to be initiated.

Figure 11:
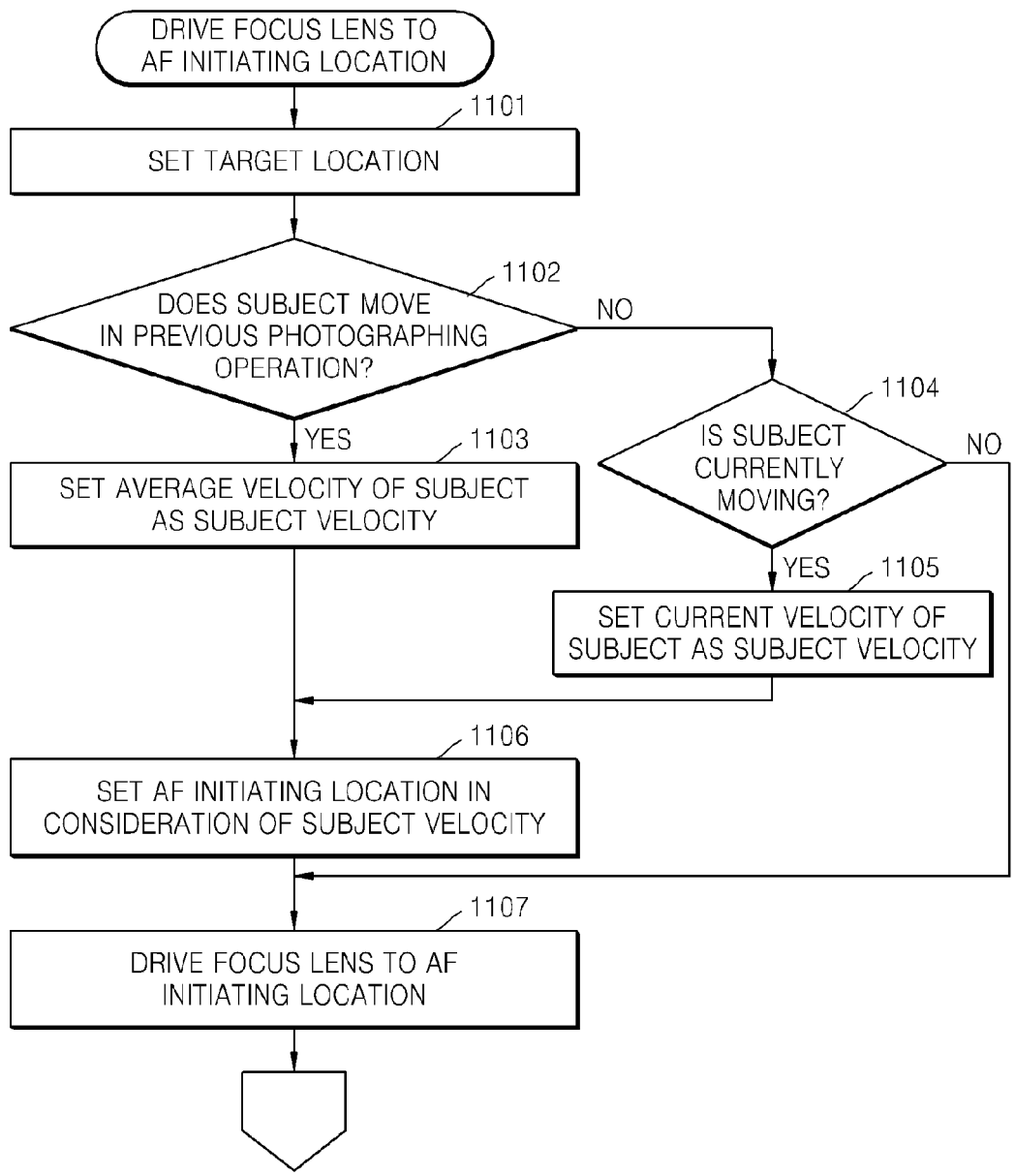
FIG. 11 is a flowchart illustrating a sub-routine for driving a focus lens to an AF initiating location, according to an embodiment.
Figure 12:
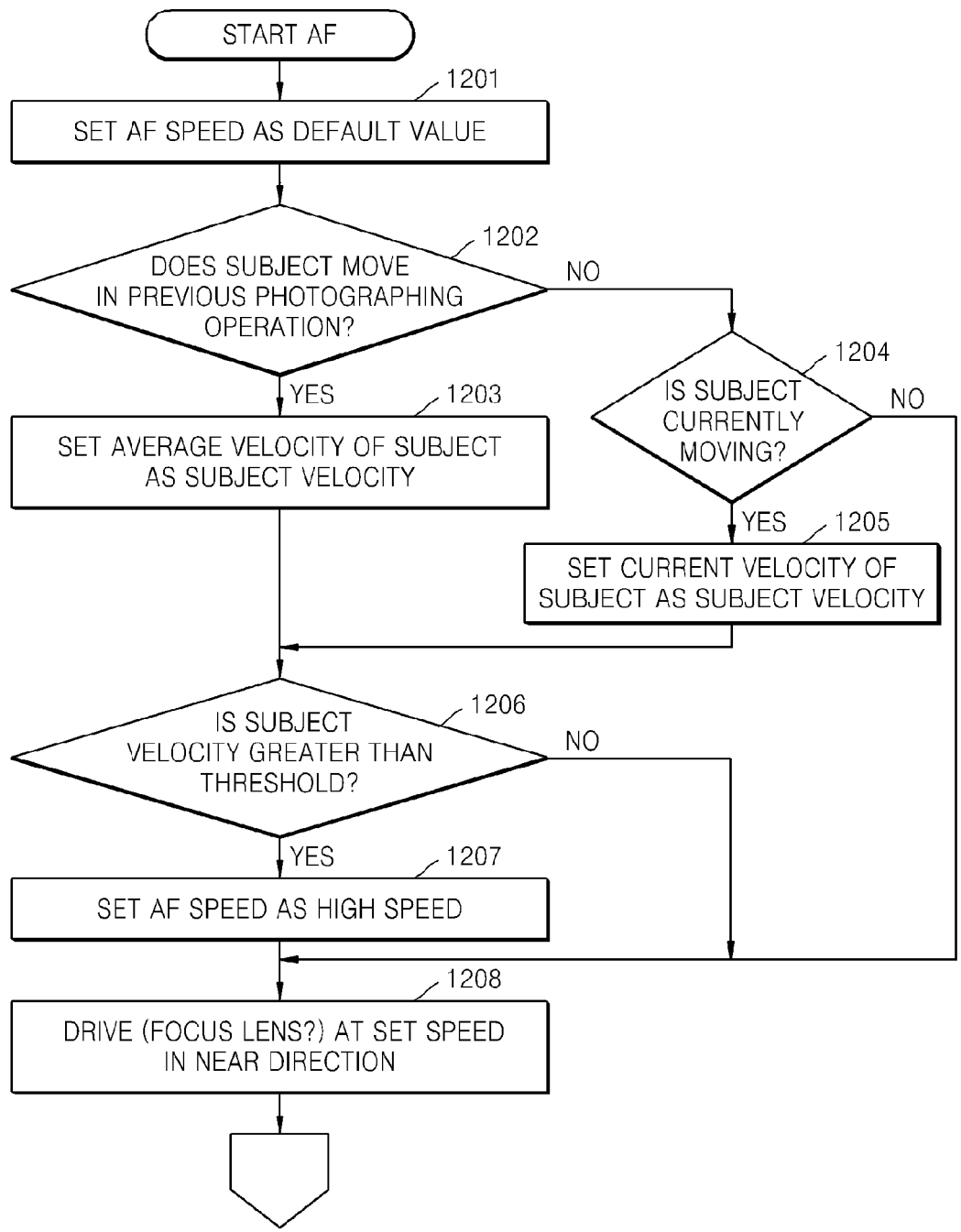
FIG. 12 is a flowchart illustrating an AF starting sub-routine according to an embodiment.
Figure 13:
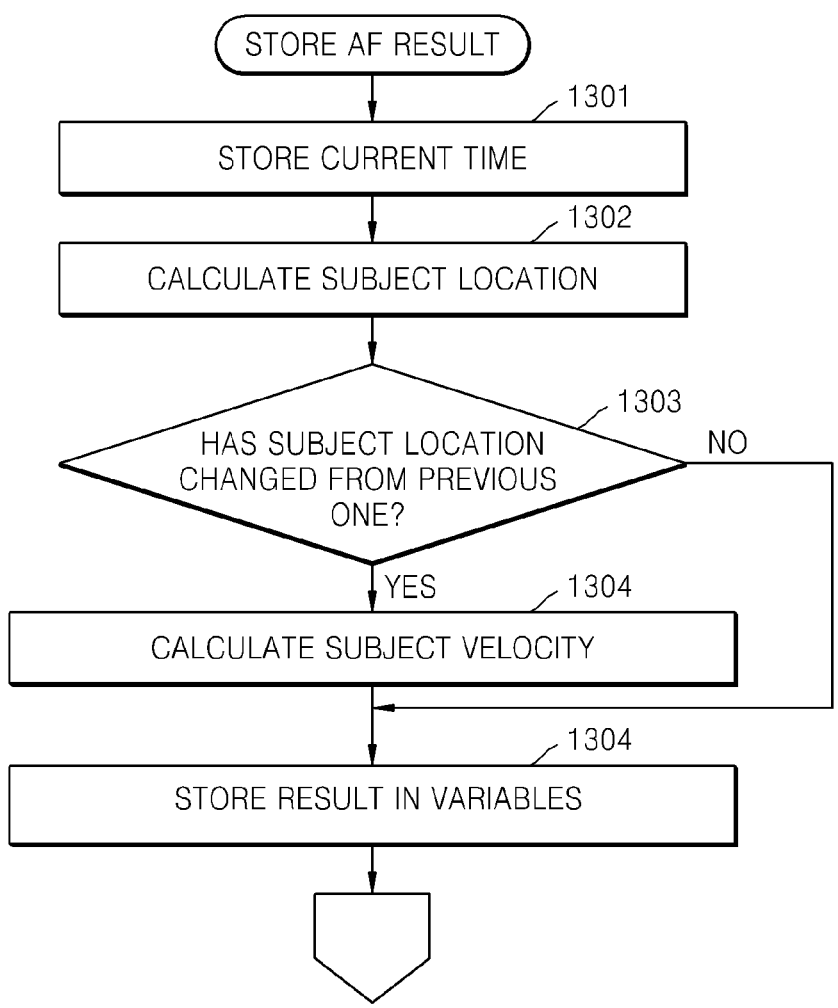
FIG. 13 is a flowchart illustrating an AF result storing sub-routine according to an embodiment.

Referring back to FIG. 9A, when the AF result clearing process is finished, the operation executes a sub-routine for performing an AF operation in operation S903. In this process, operations of driving the focus lens to the AF initiating location, starting the AF, and storing the AF result illustrated in FIGS. 11 through 13 are performed in the stated order. Therefore, the above processes will be described below with reference to FIGS. 11 through 13.

When the AF is finished in operation S903, an input of a shutter fully-pushed signal S2 is sensed in operation S904. When the signal S2 is input, the aperture 107 is driven to adjust the light intensity appropriately in operation S905. When the adjusting of the aperture 107 is finished, the imaging device 204 starts exposure for converting an optical signal to an electric signal in operation S906. In operation S907, it is determined whether the exposure is finished and a read-out starts, and if the read-out operation starts, the operation executes a sub-routine for driving the focus lens to the AF initiating location in operation S908.

FIG. 11 is a flowchart illustrating a sub-routine for driving the focus lens to the AF initiating location according to the embodiment.

During the read-out of the imaging device 204 in the continuous shooting operation, the AF initiating location, for example, a target location, is set at a location separated a predetermined distance from the current focus detected location in the infinite direction in operation S1101. When a variable representing the predetermined distance is defined as drive_inf_puls, a relation of target=AF_position−drive_inf_pulse is obtained. In operation S1102, it is determined whether the subject has moved in the previous shooting operation (OBJ_speed_pevious>0?), and if the subject has moved (YES at 1102), an average of the velocity of the subject detected in the previous shooting and the velocity of the subject in the current shooting is stored as a speed value of the subject (speed=(OBJ_speed_previous+OBJ_speed)/2)) in operation S1103. If the subject has not moved in the previous shooting (NO at 1102), it is determined whether the subject is currently moving in operation S1104 (e.g., whether OBJ_speed>0), and the current velocity of the subject is stored as a speed value of the subject in operation S1105 (speed=OBJ_speed). In operation S1106, the AF initiating location is adaptively calculated based on the above described equation with reference to FIG. 7. Here, when it is assumed that f denotes a focal distance and $T_{interval}$ denotes a variable representing an interval between the successive photographing, the AF initiating location (target) may be calculated by an equation target=f^2/(OBJ_distance+$T_{interval}$*speed-f)-drive_in_puls. In operation S1107, the focus lens 104 is moved to the calculated AF initiating location. Here, the velocity of the subject is used to calculate the AF initiating location as an example; however, a moving distance of the subject or a difference between the AF results may be used to calculate the AF initiating location.

Referring back to FIG. 9A, when the focus lens 104 is located at the AF initiating location and it is determined that the read-out is finished in operation S909 (YES at 909), the imaging operation is finished and a live view mode starts in operation S910. In addition, the operation executes the sub-routine for initiating the AF in operation S910.

FIG. 12 is a flowchart illustrating the sub-routine for initiating the AF according to the embodiment.

Referring to FIG. 12, an AF speed (AF_speed) is set as a default value (default_speed) in operation S1201 (AF_speed=default_speed), and then, it is determined whether the subject has moved in the previous shooting operation in operation S1202 (e.g., whether OBJ_speed_previous>0). If the subject has moved in the previous shooting operation (YES at 1202), an average of the velocity of the subject detected in the previous shooting and the velocity of the subject in the current shooting is set as a speed value of the subject (speed) in operation S1203 (speed=(OBJ_speed_previous+OBJ_speed)/2). If the subject has not moved in the previous shooting (NO at 1202), it is determined whether the subject is currently moving in operation S1204 (e.g., whether OBJ_speed>0), and the velocity of the subject is stored as a current speed value of the subject in operation S1205 (speed=OBJ_speed). It is determined whether the stored speed value of the subject is greater than a threshold in operation S1206 (e.g., whether speed>threshold). If the stored speed value is greater than the threshold (YES at 1206), an AF speed is set as fast (fast_speed) in operation S1207 (AF_speed=fast_speed). If the stored speed value is not greater than the threshold (NO at 1206), the AF speed is set as a default value set in operation S1201 and the focus lens 104 is moved at the set speed in the near direction to start the AF operation in operation S1208. The default and the threshold may be set by a designer, or may be calculated empirically (e.g., by the digital photographing apparatus 1).

Referring back to FIG. 9B, when the AF starts, AF detection data is acquired in operation S912, and it is determined whether a peak value of the AF detection data is detected in operation S913. If the peak value of the AF detection data is not detected for a predetermined time period (NO at 913), the focus lens 104 is driven to a previous AF location, for example, a location before moving to the AF initiating location, in order to return the focus lens 104 back to the previous AF location in operation S916. The operation executes the AF result clearing sub-routine and photographing is performed when the signal S2 is input in operation S917. If the peak value of the AF detection data is detected (YES at 913), the operation executes the AF result storing sub-routine in operation S914.

FIG. 13 is a flowchart illustrating processes of storing AF results according to an embodiment. Referring to FIG. 13, a current time (AF_detect_time) is obtained in operation S1301, and a location of the subject (OBJ_distance) is obtained in operation S1302. Here, as described above with reference to FIG. 7, the location of the subject is calculated based on the equation OBJ_distance=f^2/AF_position−f)+f. It is determined whether the previous location of the subject (OBJ_distance_previous) has been changed in operation S1303. If the previous location of the subject has been changed (YES at 1303), the velocity of the subject (OBJ_speed) is calculated based on the time stored in the operation S1301 and the location of the subject obtained in the operation S1302 and stored in operation S1304 (OBJ_speed=(OBJ_distance−OBJ_distance_previous)/(AF_detect_time−AF_detect_time_previous). When the velocity of the subject is stored, a location of the focus lens 104 prior to the previous location (AF_position_previous2), previous velocity of the subject (OBJ_speed_previous), a distance to the subject in the previous shooting (OBJ_distance_previous), and the previous AF detection time (AF_detect_time) are respectively stored as the location of the focus lens 104 in the previous shooting (AF_position_previous), the current location of the focus lens 104 (AF_position), the velocity of the subject (OBJ_speed), the distance to the subject (OBJ_distance), and the current AF detection time (AF_detect_time) in operation S1305.

Referring back to FIG. 9B, when the storing of the AF result is finished, it is determined whether the subject is moving at high speed in operation S918 in order to move the focus lens 104 to the AF location. The velocity of the subject is determined as the value stored in the variable AF_speed, which is set as described above with reference to FIG. 12. If the subject is not moving at high speed (NO at 918), the process goes to operation S923 in order to drive the focus lens 104 to the AF location through the U-turn operation for correcting the backlash. If the subject is moving at high speed (YES at 918), the U-turn operation for correcting backlash is skipped, and the process goes to operation S919 to compare the current location of the focus lens 104 with the AF location. If the AF location is greater than the current location (YES at 919), a backlash correction value is determined as a positive value in operation S920, and if the AF location is not greater than the current location (NO at 919), the backlash correction value is determined as a negative value in operation S921. In addition, the process goes to operation S922 to drive the focus lens 104 in consideration of the backlash correction value. For example, if the subject is moving at high speed, the backlash may be corrected by moving the focus lens 104 by as much as the correction value, instead of performing the U-turn correction. Thus, one direction switching operation of the focus lens 104 may be skipped, and the moving distance of the focus lens 104 may be reduced. Therefore, the AF detection speed in the continuous shooting operation may be increased, and then, a delay of the photographing interval due to the high speed movement of the subject may be prevented. After the focus lens 104, it is determined whether the shutter fully-pushed signal s2 has been released. If the signal S2 has not been released (YES at 924), the process continues to start the capture exposure at S906. If the signal S2 has been released (NO at 924), the process ends.

According to the digital photographing apparatus capable of performing high speed continuous shooting and the method of controlling the digital photographing apparatus, when continuous shooting is performed in the digital photographing apparatus using the contrast AF method, the AF initiating location and the correction operation may be adaptively adjusted based on the speed of the subject in each process, thereby improving the AF performance and the photographing speed.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A digital photographing apparatus comprising:
   a focus lens;
   a focus detection unit that detects focus in a contrast auto focusing (AF) method by moving the focus lens; and
   a controller that calculates a velocity of a subject from a first focus detection result and a second focus detection result in a continuous shooting operation, and that restricts a U-turn driving for correcting backlash of the focus lens when the calculated velocity of the subject is equal to or greater than a predetermined value;
   wherein the controller calculates a difference between the first focus detection result and the second focus detection result, and when the difference is equal to or greater than a predetermined value, the controller restricts the U-turn driving that is performed for correcting the backlash of the focus lens.

2. The digital photographing apparatus of claim 1, wherein the controller drives the focus lens to a location that is obtained by adding a backlash correction value to the detected focus, if the U-turn driving is restricted.

3. The digital photographing apparatus of claim 2, wherein the velocity of the subject is calculated based on at least two or more focus detection results.

4. The digital photographing apparatus of claim 1, wherein the velocity of the subject is calculated based on at least two or more focus detection results.

5. The digital photographing apparatus of claim 1, further comprising:
   an imaging device that is exposed to light incident through the focus lens and reads-out an image signal; and
   a controller that sets an AF initiating location based on the first focus detection result and the second focus detection result in a continuous shooting operation, and that moves the focus lens to the AF initiating location during the read-out of the imaging device.

6. The digital photographing apparatus of claim 5, wherein the controller predicts a location of a subject by calculating a difference between the first focus detection result and the second focus detection result, and sets the AF initiating location based on the predicted location of the subject.

7. A method of controlling a continuous shooting operation of a digital photographing apparatus, the method comprising:
   detecting focus in a contrast auto-focusing (AF) method by moving a focus lens;
   calculating a velocity of a subject based on a first focus detection result and a second focus detection result in a continuous shooting operation; and
   restricting a U-turn driving that is performed to correct backlash of the focus lens, when the calculated velocity of the subject is equal to or greater than a predetermined value;
   wherein a difference between the first focus detection result and the second focus detection result is calculated, and when the difference is equal to or greater than a predetermined value, the U-turn driving that is performed for correcting the backlash of the focus lens is restricted.

8. The method of claim 7, wherein in the restricting of the U-turn driving, the focus lens is moved to a location that is obtained by adding a backlash correction value to the detected focus.

9. The method of claim 7, further comprising:
   exposing an imaging device to light that is incident through the focus lens, and performing a read-out; and
   setting an AF initiating location based on the velocity of the subject, and moving the focus lens to the AF initiating location during the read-out of the imaging device, before the restricting of the U-turn driving.

10. A non-transitory computer-readable recording medium having embodied thereon a program for executing a method of performing a continuous shooting method by using a contrast auto-focusing (AF) method, the method comprising:
   detecting focus in the contrast AF method by moving a focus lens;
   calculating a velocity of a subject based on a first focus detection result and a second focus detection result of a continuous shooting operation; and
   restricting a U-turn driving that is performed for correcting backlash of the focus lens when the velocity is equal to or greater than a predetermined value;
   wherein a difference between the first focus detection result and the second focus detection result is calculated, and when the difference is equal to or greater than a predetermined value, the U-turn driving that is performed for correcting the backlash of the focus lens is restricted.

* * * * *